(12) United States Patent
Schludecker et al.

(10) Patent No.: US 9,828,052 B2
(45) Date of Patent: Nov. 28, 2017

(54) SYSTEMS AND METHODS FOR USE IN TESTING THE INSTALLATION OF AN AIRBAG MODULE IN A VEHICLE

(71) Applicant: Honda Motor Co., Ltd., Tokyo (JP)

(72) Inventors: David Edward Schludecker, Marysville, OH (US); Ryo Nakajima, Dublin, OH (US); Derek Alan Davish, Springfield, OH (US); Junichi Kakuda, Takanezawa-machi (JP); Junnosuke Sakai, Takanezawa-machi (JP); Adam William Meyer, Columbus, OH (US); Joseph Lawrence Beck, Bellefontaine, OH (US); Andrew Kent Hittle, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/142,857

(22) Filed: Apr. 29, 2016

(65) Prior Publication Data
US 2017/0313370 A1    Nov. 2, 2017

(51) Int. Cl.
*B62D 65/02*    (2006.01)
*B60R 21/203*    (2006.01)

(52) U.S. Cl.
CPC .......... *B62D 65/026* (2013.01); *B60R 21/203* (2013.01)

(58) Field of Classification Search
CPC ............................ B62D 65/026; B60R 21/203
See application file for complete search history.

(56) References Cited

U.S. PATENT DOCUMENTS

| | | | |
|---|---|---|---|
| 4,969,249 A * | 11/1990 | Yamamoto ............. | B62D 65/14 29/281.4 |
| 4,989,981 A * | 2/1991 | Kawamura .......... | G01B 11/002 356/394 |
| 5,350,190 A | 9/1994 | Szigethy | |
| 5,425,549 A | 6/1995 | Oda | |
| 5,431,061 A * | 7/1995 | Bertelsen ............. | G01M 5/005 73/852 |
| 5,738,369 A | 4/1998 | Durrani | |
| 5,765,860 A | 6/1998 | Osborn et al. | |
| 6,053,052 A * | 4/2000 | Starostovic ............. | G01N 3/20 73/851 |
| 6,672,177 B2 * | 1/2004 | Hutchenreuther | B60R 21/01532 73/865.3 |
| 6,859,677 B2 * | 2/2005 | Mitterholzer .... | G05B 19/41875 700/110 |
| 6,871,870 B2 | 3/2005 | Schneider et al. | |
| 6,874,808 B2 | 4/2005 | Marath et al. | |
| 6,877,770 B2 | 4/2005 | Paonessa | |

(Continued)

FOREIGN PATENT DOCUMENTS

| | | | | |
|---|---|---|---|---|
| FR | 2981153 A3 * | 4/2013 | .......... | G01M 17/007 |
| WO | 2012019197 A1 | 2/2012 | | |

*Primary Examiner* — Darlene P Condra
(74) *Attorney, Agent, or Firm* — Armstrong Teasdale LLP

(57) ABSTRACT

A system for use in testing the installation of an airbag module in a vehicle is provided. The system includes a jig and an instrument coupled to the jig. The instrument includes a contact assembly and a linear actuator coupled to the contact assembly such that, when the contact assembly is seated adjacent to the airbag module, the contact assembly is selectively moveable towards the airbag module relative to the jig via the linear actuator for testing the installation of the airbag module.

20 Claims, 5 Drawing Sheets

(56) References Cited

U.S. PATENT DOCUMENTS

| | | | |
|---|---|---|---|
| 7,089,803 B1* | 8/2006 | Scoville | G01N 3/20 73/856 |
| 7,193,728 B2* | 3/2007 | Ichikawa | G01B 11/14 356/399 |
| 7,631,889 B2 | 12/2009 | Watanabe | |
| 8,176,792 B2* | 5/2012 | Kozasa | G01M 5/005 73/840 |
| 8,493,455 B2* | 7/2013 | Ko | G03B 5/00 29/271 |
| 9,008,999 B2 | 4/2015 | Husain et al. | |
| 2004/0016930 A1* | 1/2004 | Yoshida | H01L 22/32 257/79 |
| 2004/0027586 A1* | 2/2004 | Ichikawa | G01B 11/14 356/614 |
| 2004/0120568 A1* | 6/2004 | Kidd | G01B 21/16 382/141 |
| 2006/0028005 A1* | 2/2006 | Dell'Eva | B60R 21/01542 280/735 |
| 2011/0192241 A1* | 8/2011 | Aiki | G01M 17/0078 73/865.3 |
| 2014/0306430 A1 | 10/2014 | Scott et al. | |
| 2015/0033531 A1 | 2/2015 | Kaphengst et al. | |

\* cited by examiner

US 9,828,052 B2

SYSTEMS AND METHODS FOR USE IN TESTING THE INSTALLATION OF AN AIRBAG MODULE IN A VEHICLE

BACKGROUND

The present disclosure relates generally to vehicles and, more particularly, to the installation of an airbag module in a vehicle.

Many known vehicles include airbags that facilitate restraining an occupant of the vehicle in the event that the vehicle impacts an object. At least some known vehicles include an airbag module installed in the steering device of the vehicle. Such airbag modules are commonly installed by manually pushing the airbag module into a receptacle defined in the steering device until the airbag module snaps in place.

BRIEF SUMMARY

In one aspect, a system for use in testing the installation of an airbag module in a vehicle is provided. The system includes a jig and an instrument coupled to the jig. The instrument includes a contact assembly and a linear actuator coupled to the contact assembly such that, when the contact assembly is seated adjacent to the airbag module, the contact assembly is selectively moveable towards the airbag module relative to the jig via the linear actuator for testing the installation of the airbag module.

In another aspect, a method for use in testing the installation of an airbag module in a vehicle is provided. The method includes seating a contact assembly of an instrument adjacent to the airbag module. The method also includes operating a linear actuator of the instrument to selectively move the contact assembly towards the airbag module for testing the installation of the airbag module.

In yet another aspect, a system for use in testing the installation of an airbag module in a vehicle is provided. The system includes a tool having a linear actuator and a contact assembly for seating adjacent to the airbag module such that, when the linear actuator is operated, the linear actuator moves the contact assembly towards the airbag module. The system also includes a computing device communicatively coupled to the tool for receiving at least one signal from the tool in response to the linear actuator moving the contact assembly towards the airbag module. The computing device has a processing device programmed to determine an installation state of the airbag module after receiving the at least one signal.

The features, functions, and advantages described herein may be achieved independently in various embodiments of the present disclosure or may be combined in yet other embodiments, further details of which may be seen with reference to the following description and drawings.

BRIEF DESCRIPTION

Although specific features of various embodiments may be shown in some drawings and not in others, this is for convenience only. Any feature of any drawing may be referenced and/or claimed in combination with any feature of any other drawing.

DETAILED DESCRIPTION

The present disclosure relates generally to systems and methods for use in testing the installation of an airbag module in a vehicle. The exemplary system includes a tool having a jig, a linear actuator coupled to the jig, and a contact assembly coupled to the linear actuator such that the contact assembly is selectively moveable relative to the jig by operating the linear actuator. For example, with respect to an airbag module that is installed on the steering wheel of an automobile by pushing the airbag module into a receptacle defined in the steering wheel until the airbag module snaps into place, the tool facilitates ensuring that such an airbag module was properly oriented and that a sufficient force was imparted to the airbag module during installation. As such, the tool confirms that the airbag module is properly installed on the steering wheel. Moreover, the tool also facilitates tracing (or recording) the result of each testing event to the vehicle identification number (VIN) or other suitable identifier of the associated vehicle. As such, the systems and methods facilitate ensuring that an airbag module is properly installed in a vehicle, and also facilitate accurately and efficiently documenting the propriety of an airbag module's installation during a vehicle assembly process.

As used herein, an element or step recited in the singular and preceded with the word "a" or "an" should be understood as not excluding plural elements or steps unless such exclusion is explicitly recited. Moreover, references to "one embodiment" and/or the "exemplary embodiment" are not intended to be interpreted as excluding the existence of additional embodiments that also incorporate the recited features.

Figure 1:
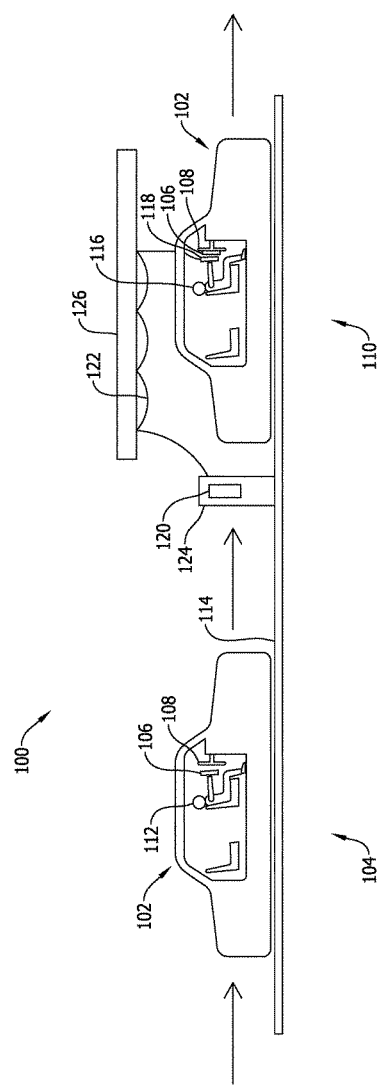
FIG. 1 is a schematic illustration of an exemplary assembly line that may be used for assembling a vehicle.

FIG. 1 illustrates an exemplary assembly line 100 that may be used for assembling a vehicle 102 (e.g., an automobile). In the exemplary embodiment, assembly line 100 includes a first workstation 104 for use in installing an airbag module 106 on a steering device (e.g., a steering wheel 108) of vehicle 102, and a second workstation 110 for use in testing the propriety of the installation of airbag module 106 on steering wheel 108. More specifically, a first operator 112 initially installs airbag module 106 on steering wheel 108 at first workstation 104, after which vehicle 102 is moved along a conveyor 114 to second workstation 110, where a second operator 116 tests the installation of airbag module 106 on steering wheel 108 using a tool 118 that confirms proper installation, corrects improper installation, and/or traces (or records) the propriety of the installation to the vehicle identification number (VIN) of vehicle 102.

In the exemplary embodiment, tool 118 is designed for handheld use and is communicatively coupled to a computing device 120 via at least one wire (e.g., a bundle of wires) 122 that facilitates transmitting electronic signals from tool 118 to computing device 120. In the exemplary embodiment, computing device 120 is stored in a cabinet 124 positioned alongside conveyor 114, and wire(s) 122 is suspended from (and is slidable along) an elevated track 126 (or festoon) in its extension from computing device 120 to tool 118, thereby providing second operator 116 with a range of motion that is sufficient to enable tool 118 to be operated as described herein. Optionally, airbag module 106 may be installed on steering wheel 108 (and the propriety of the installation may be tested) at a single workstation (i.e., both the installation and the testing may be performed at second workstation 110 by second operator 116). Moreover, in some embodiments, tool 118 may be designed to install airbag module 106 and to test the installation of airbag module 106 in a single operation (e.g., second operator 116 may utilize tool 118 to both install and to test the installation of airbag module 106 at second workstation 110). In other embodiments, tool 118 may be communicatively coupled to computing device 120 in a wireless manner (i.e., second workstation 110 may not include wire(s) 122 or track 126), and/or computing device 120 may be coupled to tool 118 such that computing device 120 is designed for handheld use together with tool 118. Alternatively, airbag module 106 may be installed on any suitable steering device, or alternatively on any suitable component, of any suitable vehicle that facilitates enabling tool 118 to test the installation of airbag module 106 as described herein.

Figure 2:
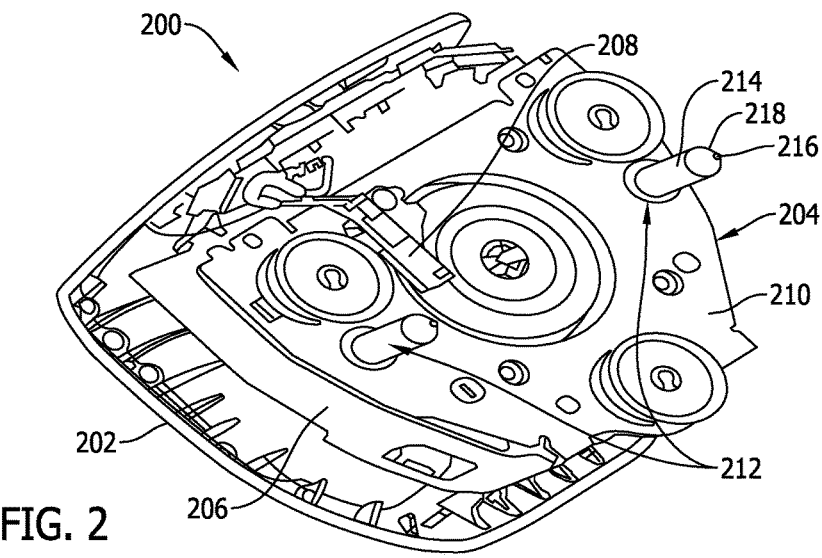
FIG. 2 is a rear perspective view of an airbag module that may be used in the vehicle shown in FIG. 1.

FIG. 2 is a rear perspective view of an exemplary airbag module 200 that may be used in vehicle 102. In the exemplary embodiment, airbag module 200 includes a cover 202, a frame 204 coupled to cover 202, an airbag assembly 206 sandwiched between cover 202 and frame 204, and an electrical connector 208 coupled to airbag assembly 206 and mounted to frame 204. Notably, frame 204 has a base plate 210 and a plurality of pins 212. Each pin 212 has a body 214 that protrudes from base plate 210 to a beveled (or sloped) tip 216 such that a groove 218 is defined behind each tip 216 at the intersection of body 214 and tip 216. Although frame 204 is illustrated with a pair of pins 212 in the exemplary embodiment, frame 204 may have any suitable number of pins 212 in other embodiments (e.g., frame 204 may have only one pin 212 in some embodiments). Moreover, although airbag assembly 206 is sandwiched between cover 202 and base plate 210 of frame 204 in the exemplary embodiment, airbag assembly 206 may have any suitable orientation relative to cover 202 and frame 204 in other embodiments.

Figure 3:
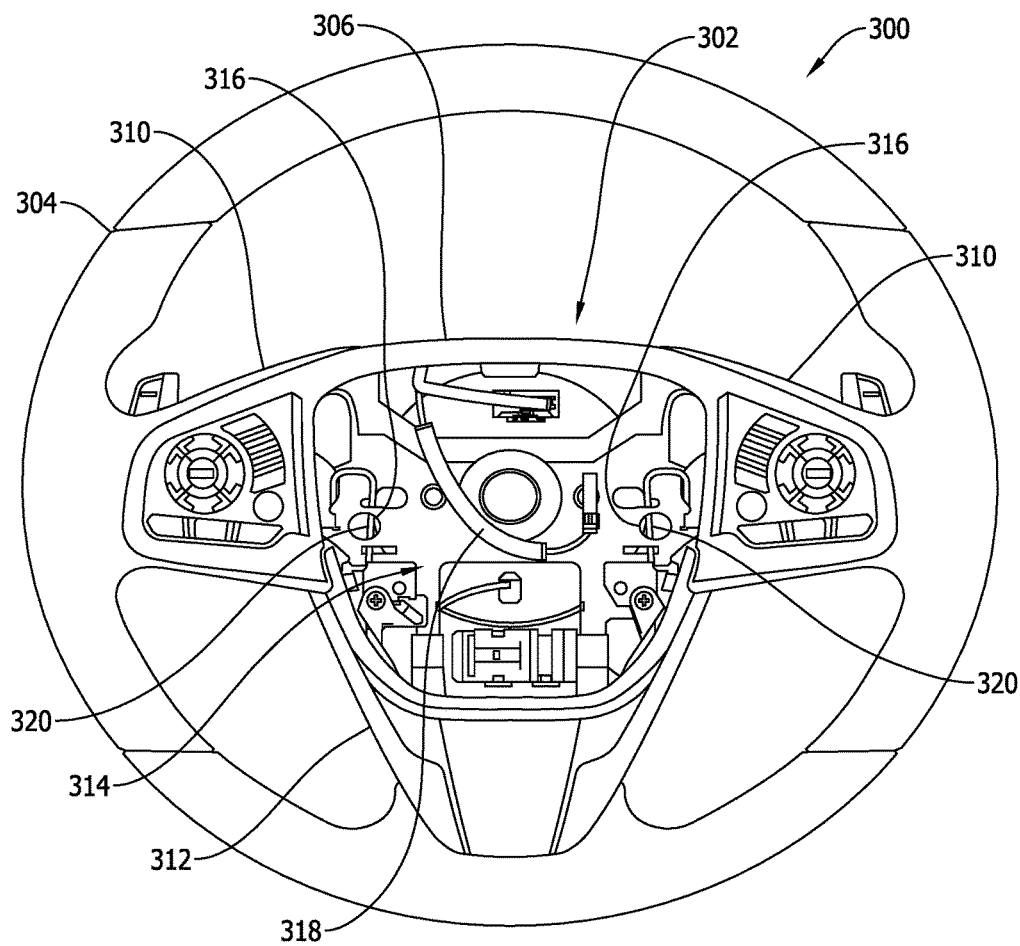
FIG. 3 is a front view of an exemplary steering wheel that may be used in the vehicle shown in FIG. 1.

FIG. 3 is a front view of an exemplary steering wheel 300 that may be used in vehicle 102. In the exemplary embodiment, steering wheel 300 includes a frame 302 and a grip 304 that circumscribes frame 302. Frame 302 has a base member 306 and a plurality of support members 310 and 312 that are integrally formed with, and extend from base member 306. More specifically, support members 310 and 312 include a pair of lateral support members 310 and a longitudinal support member 312 that extends between lateral support members 310 in circumferentially-spaced relation. As set forth in more detail below, frame 302 defines a receptacle 314 sized and oriented to receive airbag module 200 therein, and base member 306 includes a plurality of apertures 316 positioned within receptacle 314 for receiving pins 212 of airbag module 200. Pins 212 are secured within apertures 316 via at least one resilient detent 320 (e.g., a spring arm) that is coupled to base member 306 and that extends across each aperture 316 as set forth in more detail below.

A wiring harness 318 coupled to frame 302 is coupled within receptacle 314 for coupling with connector 208 of airbag module 200 when airbag module 200 is seated within receptacle 314 as described below. Optionally, grip 304 may be integrally formed with frame 302 (i.e., grip 304 may be integrally formed with support members 310 and/or 312), or grip 304 may be coupled to frame 302 using a suitable arrangement of fasteners (not shown) (e.g., grip 304 may be coupled to support members 310 and/or 312 via a plurality of screws, for example). Although longitudinal support member 312 is oriented substantially perpendicular to lateral support members 310 in the exemplary embodiment, longitudinal support member 312 may have any other suitable orientation relative to lateral support members 310 in other embodiments. Alternatively, frame 302 and grip 304 may have any suitable orientations or configurations that facilitate enabling steering wheel 300 to function as described herein (e.g., frame 302 may not include separate base and support members 306, 310, and 312, respectively, and/or grip 304 may not circumscribe frame 302).

Figure 4:
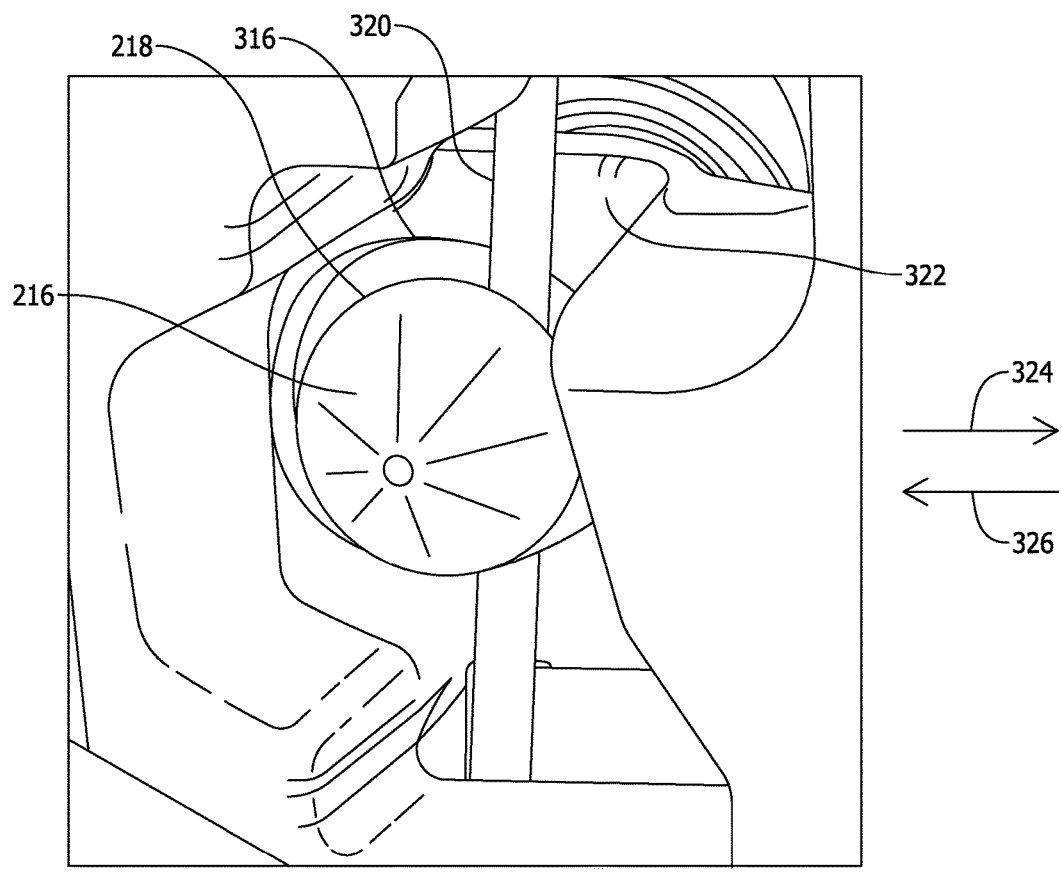
FIG. 4 is a rear perspective view of a portion of the steering wheel shown in FIG. 3 after the airbag module shown in FIG. 2 has been installed on the steering wheel in the assembly line shown in FIG. 1.

FIG. 4 is a rear perspective view of a portion of steering wheel 300 after airbag module 200 has been installed on steering wheel 300 in assembly line 100. In the exemplary embodiment, each resilient detent 320 extends across its associated aperture 316 along a rear side 322 of base member 306 such that, as airbag module 200 is installed on steering wheel 300, initially wiring harness 318 is coupled to connector 208 of airbag module 200, and subsequently, airbag module 200 is positioned over receptacle 314 such that each pin 212 is aligned with a respective aperture 316 defined in frame base member 306. First operator 112 subsequently pushes airbag module 200 into receptacle 314 such that each pin 212 is inserted into a respective aperture 316 and engages the detent 320 extending across that respective aperture 316 along rear side 322 of base member 306. More specifically, as each pin 212 is inserted into its respective aperture 316, the beveled tip 216 of each pin 212 pushes the respective detent 320 aside, causing the detent 320 to flex away from body 214 in a flexing direction 324 prior to it snapping back towards body 214 in a locking direction 326 for seating within groove 218 behind tip 216. With detents 320 seated in grooves 218, detents 320 retain pins 212 in apertures 316, and thereby retain airbag module 200 in receptacle 314.

However, in some instances, first operator 112 may not have properly oriented airbag module 200 with respect to receptacle 314 (e.g., pins 212 may not have been properly aligned with their respective apertures 316), and/or first operator 112 may not have imparted enough force to airbag module 200 to cause tips 216 to push detents 320 aside for seating within grooves 218. In such instances, airbag module 200 may nonetheless be retained within receptacle 314 despite being improperly installed (e.g., only one pin 212 may be fully inserted into its respective aperture 316 such that the respective detent 320 is properly seated within the associated groove 218, while the other pin 212 may not be fully inserted into its respective aperture 316 and, thus, its tip 216 may not have traversed its respective detent 320). Hence, it may not be readily apparent to first operator 112 that airbag module 200 is improperly installed on steering wheel 300.

To facilitate ensuring that each airbag module 200 is properly seated and installed on its respective steering wheel 300, and to facilitate tracing (or recording) the propriety of the installation to the associated vehicle 102, in the exemplary embodiment, second operator 116 subsequently tests the installation at second workstation 110 of assembly line 100 using tool 118. More specifically, second operator 116 uses tool 118 to test the installation of each airbag module 200 on its respective steering wheel 300, to correct airbag modules 200 that have been improperly installed on their respective steering wheels 300, and/or to trace the results of each test event to the associated vehicle 102 by transmitting signals generated during each test event to computing device 120 such that data associated with each testing event is recorded and associated with a specific vehicle identification number (VIN) (or other suitable identifier) of the associated vehicle 102.

Figure 5:
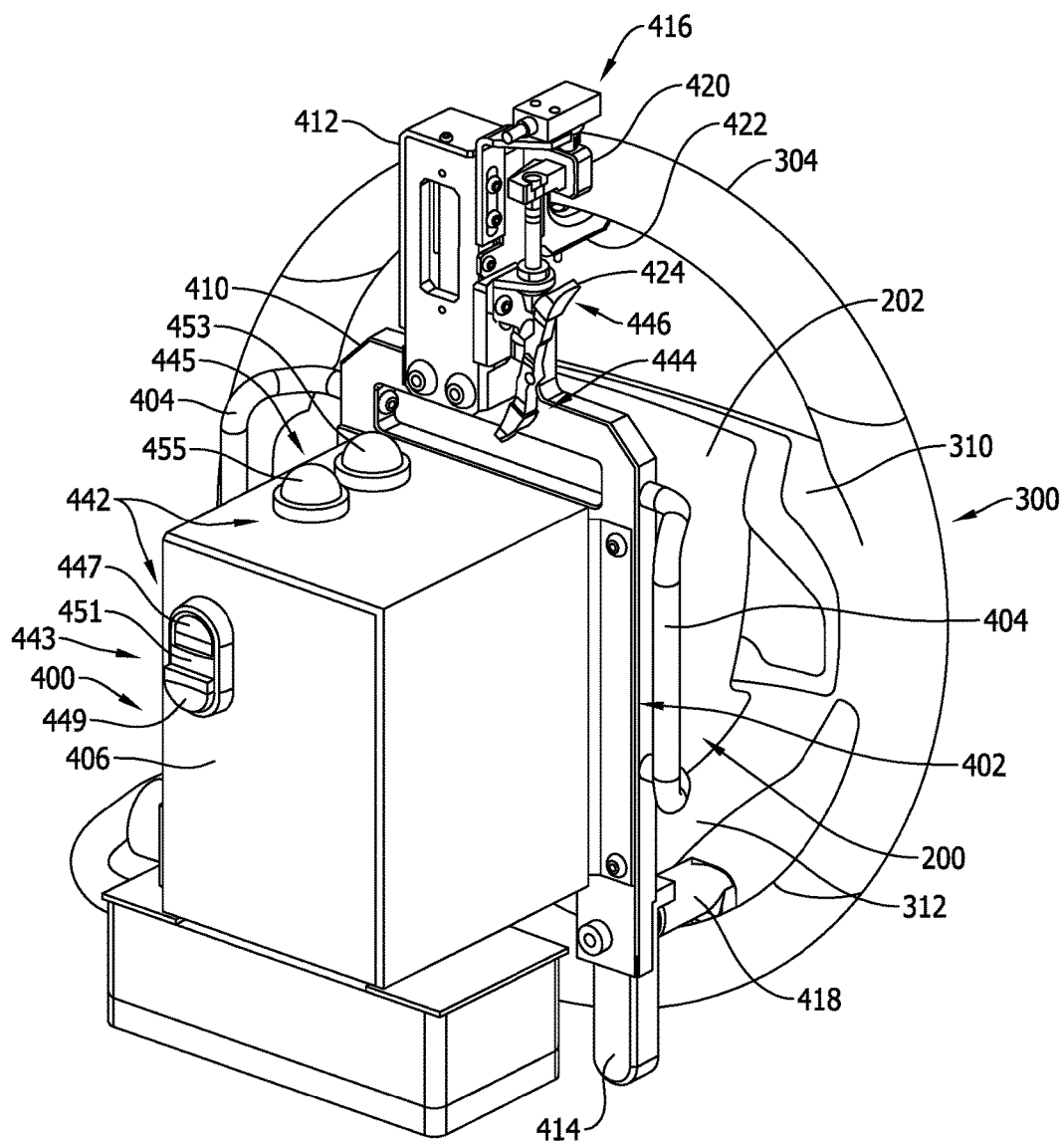
FIG. 5 is a perspective view of an exemplary tool that may be used to test the installation of the airbag module on the steering wheel as shown in FIG. 4.
Figure 6:
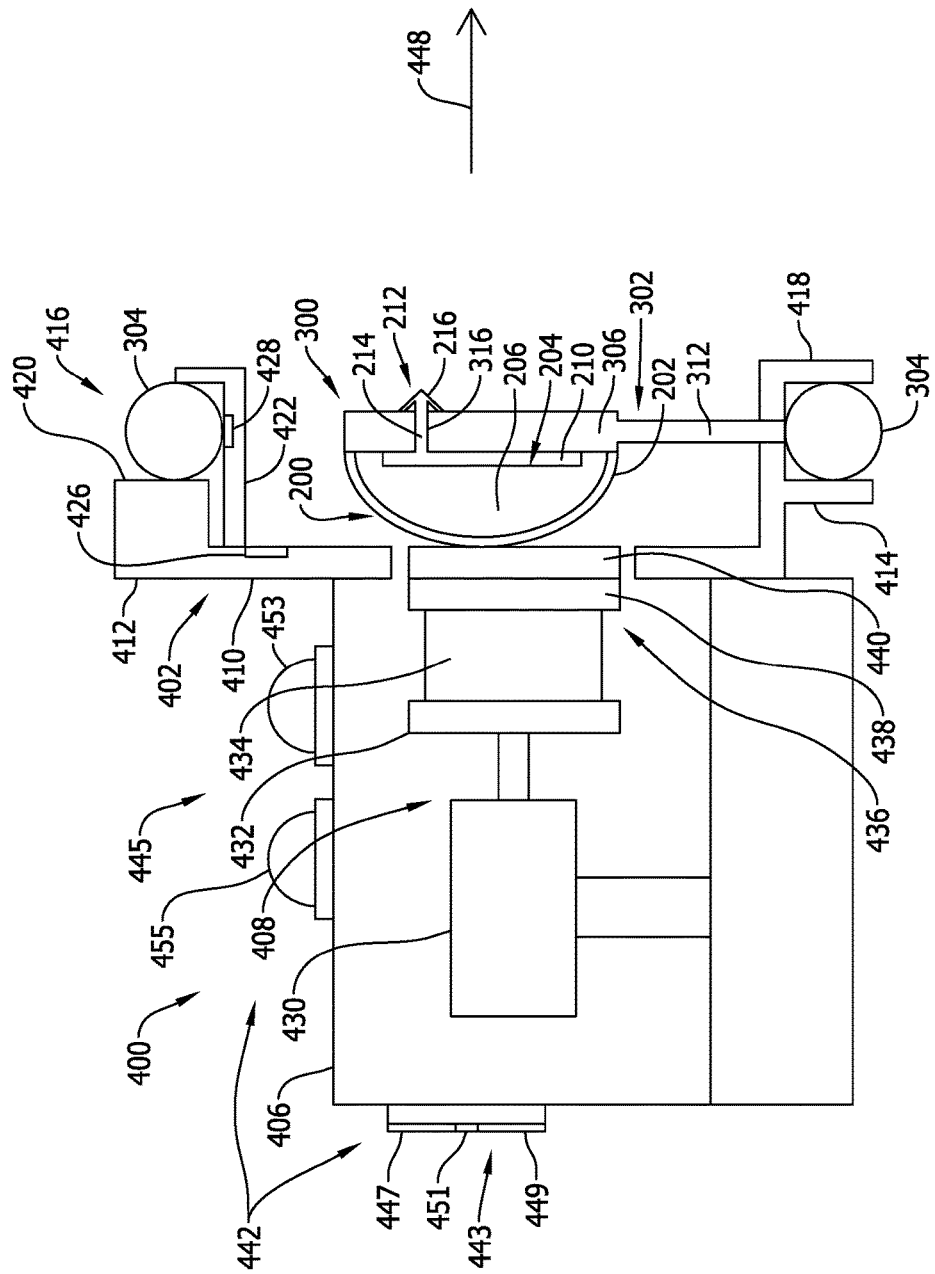
FIG. 6 is a schematic cross-sectional view of the tool shown in FIG. 5.

FIGS. 5 and 6 are respective perspective and schematic cross-sectional views of an exemplary tool 400 that may be used to test the installation of airbag module 200 on steering wheel 300. In the exemplary embodiment, tool 400 includes a jig 402, a pair of handles 404 coupled to jig 402, a housing 406 coupled to jig 402 between handles 404, and an instrument 408 coupled to jig 402 within housing 406. Jig 402 includes a main plate 410, an upper arm 412 projecting from main plate 410, and a pair of lower arms 414 (with only one being illustrated in FIGS. 5 and 6) projecting from main plate 410 and opposite upper arm 412. To facilitate coupling jig 402 to steering wheel grip 304 as set forth in more detail below, an upper hook 416 is coupled to upper arm 412, and a lower hook 418 is coupled to each lower arm 414. Upper hook 416 includes a stationary member 420 and a moveable member 422 that can be selectively adjusted and locked via a lever 424. Moreover, upper hook 416 includes a first sensor 426 for use in detecting that upper hook is locked, and a second sensor 428 for use in detecting that grip 304 of steering wheel 300 is seated against moveable member 422. Sensors 426 and 428 are communicatively coupled to computing device 120 to facilitate transmitting signals to computing device 120 that are indicative of a state of upper hook 416. Alternatively, upper hook 416 may have any suitable number of sensors arranged in any suitable manner that facilitates enabling tool 400 to function as described herein. Although upper hook 416 is selectively actuated via lever 424 in the exemplary embodiment, upper hook 416 may be actuated in any suitable manner in other embodiments (e.g., upper hook 416 may be automated in some embodiments).

In the exemplary embodiment, instrument 408 includes a linear actuator 430, a backing plate 432, a load cell 434, and a contact assembly 436 having a plate-shaped contact member 438 and a pad member 440 (e.g., a cushioned pad member). Pad member 440 is coupled to contact member 438 such that pad member 440 and/or contact member 438 is substantially aligned (e.g., is substantially coplanar) with main plate 410 of jig 402 in a resting state of tool 400 (as shown in FIG. 6), and load cell 434 is sandwiched between contact member 438 and backing plate 432, which is in turn coupled to linear actuator 430. Load cell 434 and/or linear actuator 430 are communicatively coupled to computing device 120 to facilitate transmitting signals from linear actuator 430 and/or load cell 434 to computing device 120 that are indicative of an operating state of instrument 408. Although linear actuator 430 is an electric linear actuator in the exemplary embodiment (e.g., a ROBO Cylinder® from International Automation Industry (IAI)), linear actuator 430 may be any suitable type of linear actuator in other embodiments (e.g., a pneumatic or hydraulic linear actuator). Moreover, although contact member 438 is plate-shaped in the exemplary embodiment, contact member 438 may have any suitable shape in other embodiments. Alternatively, instrument 408 may not include load cell 434 (e.g., linear actuator 430 may be designed to perform the functions of load cell 434 as described herein), and/or contact assembly 436 may not include pad member 440 (e.g., contact member 438 may be designed for seating directly against airbag module 200).

In the illustrated embodiment, tool 400 also includes a user-interface 442 coupled to housing 406 (e.g., at least one button 443 for operating instrument 408, and at least one light 445 for indicating an operational state of instrument 408 and/or a pass/fail status of a testing event). For example, user-interface 442 may have a first (or "start test") button 447, a second (or "stop test") button 449, a first (or "operating state") light 451, a second (or "test passed") light 453, and a third (or "test failed") light 455. In other embodiments, tool 400 may have any suitable user interface that facilitates enabling tool 400 to function as described herein.

To test the installation of airbag module 200 at second workstation 110 of assembly line 100 using tool 400, second operator 116 couples jig 402 to steering wheel 300 by seating hooks 418 at the bottom segment of grip 304 such that hooks 418 straddle longitudinal support member 312. Second operator 116 then pivots main plate 410 of jig 402 toward airbag module 200 until grip 304 is positioned against stationary member 420 and above moveable member 422 of upper hook 416 at the top segment of grip 304. As such, with jig 402 spanning grip 304 from top to bottom, second operator 116 then rotates lever 424 from an unlocked position 444 (in which moveable member 422 is lowered) to a locked position 446 (in which moveable member 422 is raised into firm contact with grip 304 as shown in FIGS. 5 and 6), thereby locking jig 402 to steering wheel 300. Notably, when jig 402 is locked to steering wheel 300 in this manner, pad member 440 of instrument 408 is seated adjacent to (e.g., against) cover 202 of airbag module 200. Optionally, pad member 440 may be contoured to mirror a curvature of cover 202 to facilitate mitigating damage (e.g., scuffing or scratching) to cover 202.

After sensors 426 and/or 428 transmit at least one signal to computing device 120 that is indicative of jig 402 being properly mounted on steering wheel 300 (e.g., at least one signal indicative of upper hook 416 being locked and/or grip 304 being seated against moveable member 422), computing device 120 then permits second operator 116 to operate instrument 408 via user interface 442 (e.g., button 447) such that linear actuator 430 moves backing plate 432 (and, therefore, load cell 434, contact member 438, and pad member 440) relative to main plate 410 of jig 402 and towards airbag module 200 in a pushing direction 448. For example, in one embodiment, second operator 116 may push first button 447 to start a testing event, and may subsequently push second button 449 to stop the testing event if desired. Notably, computing device 120 selectively illuminates first light 451 for indicating a state of operation of tool 400 to second operator 116 such as by, for example, not illuminating first light 451 until jig 402 is locked onto steering wheel 300, flashing first light 451 after jig 402 has been locked onto steering wheel 300, and fully illuminating (i.e., not flashing) first light 451 after first button 447 has been pressed and a testing event started. In other embodiments, first light 451 may be illuminated in any suitable manner to indicate any suitable operating state of tool 400.

Notably, linear actuator 430 is designed (or set) to impart a predetermined and constant magnitude of force (e.g., 100 newtons) to airbag module 200 over a predetermined period of time (e.g., three seconds). While ramping up to the predetermined magnitude of force and/or while holding the predetermined magnitude of force for the predetermined period of time, linear actuator 430 transmits at least one signal to computing device 120 that is indicative of the distance over which backing plate 432 and/or contact assembly 436 travels in pushing direction 448, and/or load cell 434 transmits at least one signal to computing device 120 that is indicative of a load that is experienced by instrument 408 during the associated installation test.

After processing such signal(s) received from linear actuator 430 and/or load cell 434, computing device 120 determines an installation state of airbag module 200 (i.e., whether airbag module 200 is properly installed or improperly installed) by identifying whether the associated distance of travel and/or the experienced load exceeds a predetermined threshold (or is outside of a predetermined range of values). Computing device 120 then operates user-interface 442 (e.g., light(s) 445 of user interface 442) to indicate to second operator 116 that either airbag module 200 passed the installation test (meaning that airbag module 200 was properly installed at first workstation 104) or airbag module 200 failed the installation test (meaning that airbag module 200 was improperly installed at first workstation 104). For example, in one embodiment, computing device 120 may illuminate second light 453 (but not first light 451) if airbag module 200 passes the installation test, and may illuminate third light 455 (and flash first light 451) if airbag module 200 fails the installation test. Notably, in some embodiments, computing device 120 may also trace (or record) each testing event to vehicle 102 by storing data indicative of each testing event (e.g., data indicative of the pass/fail result of each testing event, the travel of base plate 432 and/or contact assembly 436 during each testing event, and/or the load experienced by instrument 408 during each testing event).

In some instances, tool 400 may automatically repair an improper installation of airbag module 200 if, for example, airbag module 200 was improperly installed by virtue of pin(s) 212 not being pushed a sufficient distance into aperture(s) 316 by first operator 112 and, hence, not being fully engaged by resilient detent(s) 320. More specifically, contact assembly 436 may, as a function of performing the installation test, push pin(s) 212 the additional distance needed for them to fully engage resilient detent(s) 320 and be secured in place. However, if tool 400 cannot automatically repair the improper installation of airbag module 200, second operator 116 may receive an indication that airbag module 200 failed the installation test (e.g., via first light 451 and/or third light 455), and additional action may be taken to repair the improper installation of the airbag module 200, or to install a new airbag module, as appropriate.

The above-described embodiments include at least the following technical effects: (1) providing a tool that enables performing an automated test of an airbag module's installation in a vehicle; (2) providing a tool that enables testing the installation of an airbag module that was installed by pushing the airbag module into a receptacle defined in a steering wheel; (3) providing a tool that enables testing for a properly installed airbag module by pushing on the airbag module and analyzing data associated with the resulting load and travel experienced by an instrument of the tool during the testing event; and (4) providing a tool that enables each test of an airbag module's installation to be traced to the associated vehicle. As such, the embodiments facilitate enhancing the overall level of vehicle safety, in addition to enhancing the overall level and quality of documentation associated with a vehicle assembly process.

The systems and methods described herein facilitate providing tools for use in testing the installation of an airbag module in a vehicle. More specifically, with respect to an airbag module that is installed on the steering wheel of an automobile by pushing the airbag module into a receptacle defined in the steering wheel until the airbag module snaps into place, the systems and methods facilitate ensuring that the airbag module was properly oriented and that a sufficient force was applied to the airbag module during installation. As such, the tool confirms that the airbag module has been properly installed on the steering wheel. The systems and methods further facilitate tracing the results of the test event (i.e., the propriety of the installation) to the vehicle identification number (VIN) or other suitable identifier of the associated vehicle. Thus, the systems and methods facilitate ensuring that an airbag module is properly installed in a vehicle, and also facilitate accurately and efficiently documenting the propriety of the airbag installation in the vehicle while the vehicle is being assembled. The overall level of vehicle safety, in addition to the overall level and quality of documentation associated with a vehicle assembly process, are thereby enhanced.

Exemplary embodiments of systems and methods for use in testing the installation of an airbag module in a vehicle are described above in detail. The systems and methods are not limited to the specific embodiments described herein, but rather, components of the systems and/or steps of the methods may be utilized independently and separately from other components and/or steps described herein. Each method step and each component may also be used in combination with other method steps and/or components. Although specific features of various embodiments may be shown in some drawings and not in others, this is for convenience only. Any feature of a drawing may be referenced and/or claimed in combination with any feature of any other drawing.

Some embodiments involve the use of one or more electronic or computing devices. Such devices typically include a controller or processing device such as a general purpose central processing unit (CPU), a graphics processing unit (GPU), a microcontroller, a reduced instruction set computer (RISC) processor, an application specific integrated circuit (ASIC), a programmable logic controller (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by the controller or processing device, cause the controller or processing device to perform at least some of the method steps described herein. The above examples are exemplary only, and thus are not intended to limit in any way the definition and/or meaning of the terms controller and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for use in testing the installation of an airbag module in a vehicle, said system comprising:
   a jig comprising a hook that is selectively coupleable and selectively lockable to a portion of the vehicle; and
   an instrument coupled to said jig, said instrument comprising a contact assembly and a linear actuator coupled to said contact assembly such that, when said contact assembly is seated adjacent to the airbag module, said contact assembly is selectively moveable towards the airbag module relative to said jig via said linear actuator for testing the installation of the airbag module.

2. The system of claim 1 wherein said instrument comprises a load cell coupled to said contact assembly.

3. The system of claim 2 further comprising a computing device communicatively coupled to at least one of said linear actuator and said load cell for transmitting at least one signal to said computing device when testing the installation of the airbag module.

4. The system of claim 3 wherein said linear actuator is set to selectively move said contact assembly towards the airbag module such that said contact assembly imparts a constant magnitude of force to the airbag module over a predetermined period of time.

5. The system of claim 4 wherein said computing device is programmed to determine, after processing the at least one signal received from at least one of said linear actuator and said load cell, an installation state of the airbag module by identifying that at least one of a distance of travel of said contact assembly and a load experienced by said load cell exceeds a predetermined threshold.

6. The system of claim 1 wherein the portion of the vehicle comprises a steering wheel, wherein said hook is selectively coupled and selectively locked to the steering wheel.

7. The system of claim 6 wherein the steering wheel has a circumferential grip, said jig sized to span the grip of the steering wheel.

8. A method for use in testing the installation of an airbag module in a vehicle, said method comprising:
    seating a contact assembly of an instrument adjacent to the airbag module; and
    operating a linear actuator of the instrument to selectively move the contact assembly towards the airbag module for testing the installation of the airbag module.

9. The method of claim 8 wherein seating a contact assembly comprises coupling a jig to a steering wheel on which the airbag module is installed, wherein the instrument is coupled to the jig such that the contact assembly is seated adjacent to the airbag module when the jig is coupled to the steering wheel.

10. The method of claim 9 wherein operating a linear actuator comprises operating the linear actuator after determining, via a computing device communicatively coupled to a sensor of the jig, that the jig is coupled to the steering wheel.

11. The method of claim 8 wherein operating a linear actuator comprises selectively moving the contact assembly towards the airbag module such that the contact assembly imparts a constant magnitude of force to the airbag module over a predetermined period of time.

12. The method of claim 11 wherein operating a linear actuator further comprises determining, via a computing device communicatively coupled to at least one of the linear actuator and a load cell coupled to the contact assembly, an installation state of the airbag module by identifying that at least one of a distance of travel of the contact assembly and a load experienced by the load cell exceeds a predetermined threshold.

13. A system for use in testing the installation of an airbag module in a vehicle, said system comprising:
    a tool comprising a linear actuator and a contact assembly for seating adjacent to the airbag module such that, when said linear actuator is operated, said linear actuator moves said contact assembly towards the airbag module; and
    a computing device communicatively coupled to said tool for receiving at least one signal from said tool in response to said linear actuator moving said contact assembly towards the airbag module, said computing device comprising a processing device programmed to determine an installation state of the airbag module after receiving the at least one signal.

14. The system of claim 13 wherein said tool comprises a load cell coupled to said contact assembly.

15. The system of claim 14 wherein said computing device is communicatively coupled to at least one of said linear actuator and said load cell for transmitting at least one signal to said computing device when testing the installation of the airbag module.

16. The system of claim 15 wherein said linear actuator is set to selectively move said contact assembly towards the airbag module such that said contact assembly imparts a constant magnitude of force to the airbag module over a predetermined period of time.

17. The system of claim 16 wherein said processing device is further programmed to determine, after processing at least one signal received from at least one of said linear actuator and said load cell, an installation state of the airbag module by identifying that at least one of a distance of travel of said contact assembly and a load experienced by said load cell exceeds a predetermined threshold.

18. The system of claim 13 wherein said tool comprises a user-interface communicatively coupled to said computing device, said processing device further programmed to indicate the installation state via said user-interface.

19. The system of claim 13 wherein the airbag module is installed on a steering wheel of the vehicle, said tool comprising a jig having a hook for coupling said jig to the steering wheel, said hook comprising a sensor communicatively coupled to said computing device for transmitting at least one signal to said computing device for indicating that said hook is coupled to the steering wheel.

20. The system of claim 19 wherein said processing device is further programmed to prevent said linear actuator from being operated to move said contact assembly towards the airbag module until the at least one signal is received from said sensor.

* * * * *